Nov. 10, 1931.   B. W. KADEL   1,831,008
GEARED HAND BRAKE
Original Filed Aug. 7, 1920   2 Sheets-Sheet 1
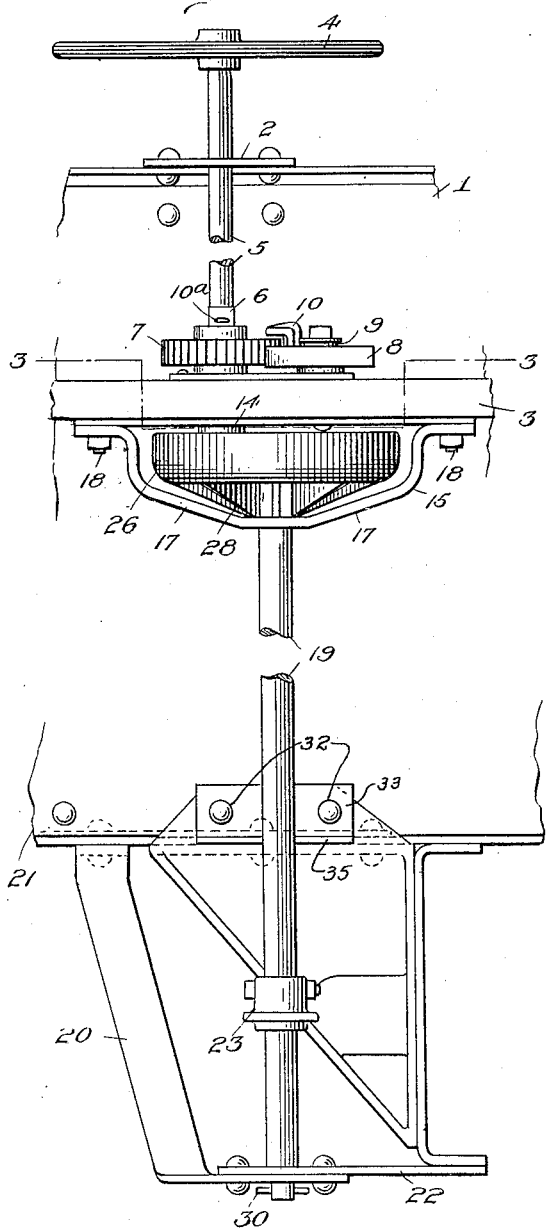
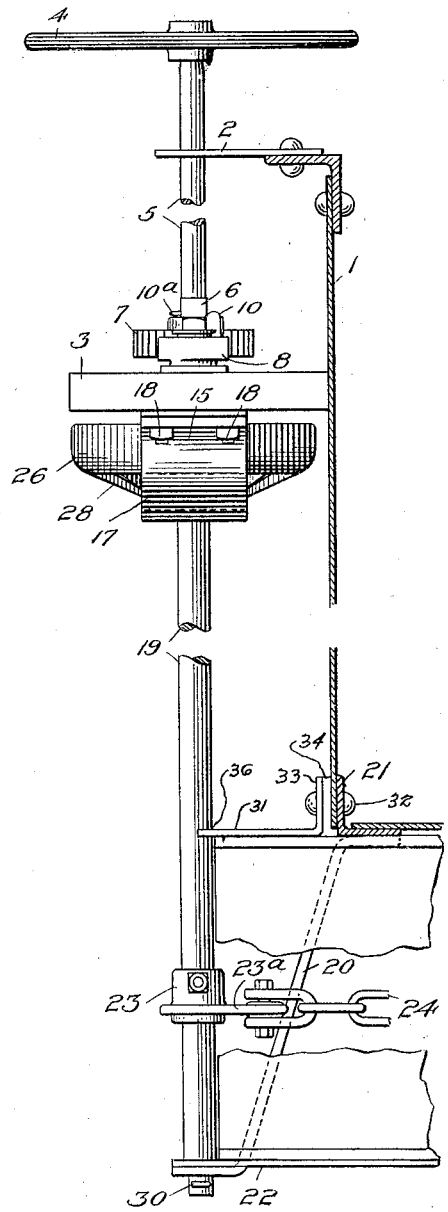
Witness
Edwin L. Bradford
Inventor
Byro W. Kadel
By Ernest F. Mechlin
His Attorney Nov. 10, 1931. B. W. KADEL 1,831,008
GEARED HAND BRAKE
Original Filed Aug. 7, 1920  2 Sheets-Sheet 2
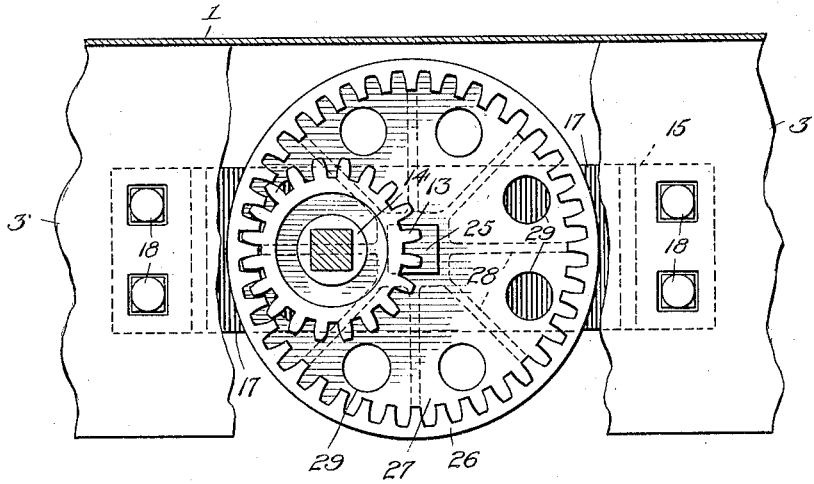
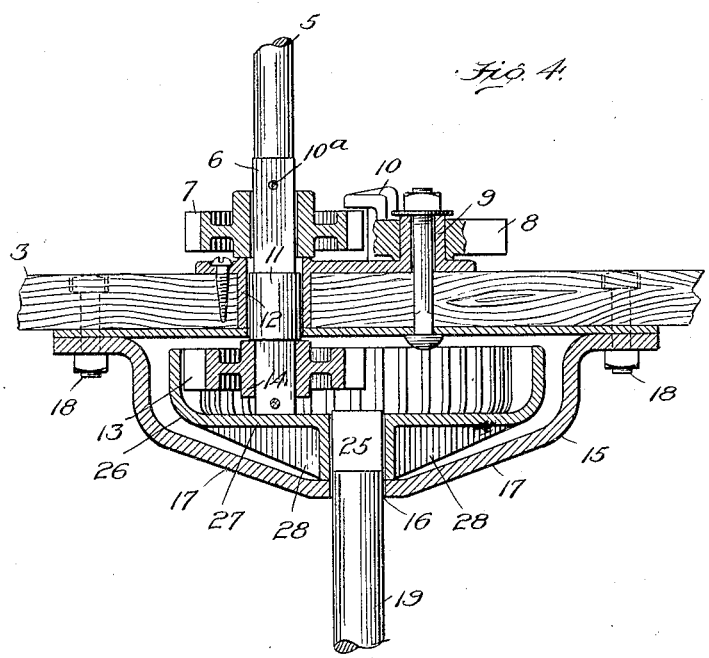

Patented Nov. 10, 1931

1,831,008

UNITED STATES PATENT OFFICE

BYERS W. KADEL, OF BALTIMORE, MARYLAND

GEARED HAND BRAKE

Application filed August 7, 1920, Serial No. 401,833. Renewed September 10, 1928.

The invention relates to railway cars and more particularly to means for manually operating the brakes thereof, and the principal object of the invention is to provide a novel form of geared hand brake suitable for attachment to freight cars.

To this end and the primary feature of the invention, generally stated, comprises a hand wheel rigidly fixed to a shaft, and a separate shaft rotatably mounted on the car and connected to the brake lever by suitable mechanism and operatively connected to the first named shaft by a novel arrangement of intermeshing gears.

Another feature of the invention is to arrange a pair of parallel shafts mounted off center with respect to each other, and to operatively connect the shafts by suitable gearing and to locate it beneath the brake step and thereby protect the gearing from the entrance of foreign matter which would be detrimental to the operation of the mechanism.

The invention further consists in the elements and combinations of elements hereinafter more fully described, the novel features whereof are specifically pointed out in the claims at the end of the specification.

Referring now to the drawings, wherein I have illustrated but a single embodiment of the invention,—

Figure 1 is a front elevation of a fragmentary portion of a freight car showing the invention applied thereto.

Figure 2 is a view in side elevation of a brake shaft embodying the invention, portions of the car underframe being shown in section.

Figure 3 is a section on the line 3—3 of Fig. 1.

Figure 4 is a transverse sectional view of the power shafts showing the form of gear mechanism in detail.

Throughout the specification and drawings like parts are designated by like reference characters.

The numeral 1 designates the end framing of a freight car to which is suitably connected, by means of the brackets 2 and the brake step 3, a hand brake wheel 4 and associated shaft 5. The said shaft 5 will hereinafter for convenience be referred to as the low powered shaft. Fitting on a squared portion 6 of the low powered shaft 5 is a ratchet wheel 7, and pivotally mounted in a conventional manner at a point adjacent to the ratchet is a pawl 8 adapted to mesh with the ratchet 7 and to prevent the rotation thereof after the application of the brakes. The pivot member 9 on which the pawl 8 is mounted is provided with a lip 10 adapted to overlie the ratchet wheel 7 to prevent the same from moving upwardly from the squared portion 6 should the cotter pin 10$^a$ be displaced or broken. Below the ratchet 7 the low powered shaft 5 is provided with a collar or cylindrical bearing portion 11 adapted to fit within the bearing 12 suitably provided in the brake step. This collar 11 may be conveniently furnished with an internal squared portion adapted to slip over the squared portion 6 of the shaft, and below the collar 11 I provide the shaft 5 with a gear wheel 13 fixedly mounted on the said shaft in any convenient manner, as for example, by providing the same with a rectangular collar 14 adapted to fit the squared portion 6 of the said shaft.

To the lower side of the brake step I provide a bracket 15 which may be conveniently formed with a cylindrical opening 16, the said bracket having a downwardly deflected central portion 17 and being connected to the brake step 3 by means of the bolts 18. A second shaft 19 is rotatably mounted within the opening 16 and has its lower end rotatably supported in a bracket 20 which depends from the end sill 21 of the car framing 1. The lower portion of the said bracket 20 may be strengthened by providing a tie 22 riveted to the lower portion of the bracket 20 and suitably connected to one of the center sills of the car. Intermediate the bracket 20 and the end sill 21 I fixedly secure to the said shaft 19 a chain lever 23 having a lever arm 23$^a$ to which is connected in any suitable manner the brake chain 24. The portion of the high powered shaft beneath the lever 23 is utilized as a chain drum, the lever arm 23$^a$ acting as a quick take-up to gather up the slack at the first half revolution of the high power shaft.

The portion of the shaft 19 which projects upward through the bearing 16 may be provided with a squared portion 25 to which is secured in any suitable way an internal toothed gear wheel 26, the teeth of the gear wheel 26 being adapted to mesh with the external teeth provided on the gear wheel 13, clearly seen in Figs. 3 and 4. The gear wheel 26 is preferably closed on its lower side by the web 27, and intermediate the ribs 28 which reinforce and strengthen the web 27, I provide openings 29 to permit the escape of water or other foreign substances which might become lodged within the gear wheel 26.

In the arrangement shown the gear wheel 13, which is secured to the low powered shaft 5, is provided with half as many teeth as the gear wheel 26 which is fixedly connected to the high powered shaft 19. By this arrangement approximately twice the force transmitted to the low powered shaft 25 is transmitted to the brake chain 24 through the high powered shaft 19. It is to be understood, of course, that this arrangement of gear teeth is merely illustrative, and I do not intend to limit my invention to this duplication of force, since it is obvious that larger or smaller gear wheels 13 could be advantageously employed and that in this way the force transmitted to the brake chain varied in accordance with the necessities of service.

It will be observed that the point of contact between the gear wheels 13 and 26 is on a transverse line which is substantially parallel to the end of the car. By this arrangement all danger of the gear wheels being locked together, due to either shaft being struck by the adjacent car, is avoided and the mechanism will also not be interlocked should the end framing of the car on which the same is mounted bulge as sometimes occurs due to severe shocks, shifting of the lading, overloading, and other causes.

Another feature of my invention resides in the ease with which the device may be assembled with and removed from the car. For instance, in case of damage to the high power shaft 19 the same may be readily removed without dismantling the mechanism by removing the cotter 30 which extends through the portion of the shaft below the bracket 20 and sliding the shaft upwardly and then springing the lower portion of the shaft out of the bracket 20, the squared portion 25 thereof being removable downwardly from the gear wheel 26.

Another feature of my invention resides in the employment of the brake shaft bearing 31 which may be, as shown particularly in Figures 1 and 2, formed as an angle iron with a vertical leg secured to the end of the car as by means of rivets 32 passing through the end sill 21, end plate 33 and, if desired, a filler piece 34, a horizontal leg 35 of said angle iron extending outwardly toward the shaft 19 and providing a semi-cylindrical bearing notch 36 opening outwardly as illustrated. Such a bearing provides for ready assembly and disconnection of the brake shaft with respect thereto and it should be noted that, at the same time, it provides adequate support for the shaft as the pull of the chain 24 is always in one direction. In freight cars subject to end impacts, this type of bearing bracket is especially good for a heavy impact will often with a complete eye bearing bracket result in a bent brake shaft. Furthermore, with the open or half eye, a bent shaft will not be so serious in that it sweeps away from the bracket during one-half of each revolution.

Having now described my invention, although it is to be understood that the language here employed is to be taken in its descriptive and not in its limiting sense, what I claim and desire to secure by Letters Patent is:—

1. In a brake mechanism for freight cars, the combination with a car frame, of a brake step connected thereto, a shaft journaled in said brake step, said shaft being provided at one end beneath the brake step with a gear and having at its other end power applying means, a second shaft provided with a gear adapted to mesh with said first named gear at a point of tangency on a radius extending approximately transversely of the car and relatively close to the underside of said brake step, said second named shaft extending below the step and having a portion forming a winding drum, and means including a bracket connected to the underside of said brake step and adapted to form a bearing for the second named shaft, said bracket also acting to support the gear carried by said second named shaft.

2. In a hand brake mechanism for freight cars, the combination with a car frame, of a brake step connected thereto, a shaft journaled in said brake step, said shaft being provided at one end beneath the brake step with a gear and having at its other end power applying means, a second shaft provided with a gear adapted to mesh with said first named gear, the axis of the first named shaft being located within the limits of the second named gear and the point of tangency of the meshing gears being disposed transversely of the car from the center of one of said shafts, a winding drum provided on said second named shaft, and means for supporting the second named gear, said means also forming a bearing for the second named shaft and being connected to the underside of the brake step at points upon each side of the point of transverse tangency of the meshing gears.

3. In a device of the character described, the combination with car frame bracket bearings and a car step, of a shaft journaled in one of said bracket bearings and said car step, a gear provided on said shaft, another shaft having connected thereto a gear adapted to mesh with said first named gear, said last named shaft being journaled at its upper end immediately beneath said brake step and at its lower end in another of said bracket bearings provided on the car frame, and means including a casing provided on one of said gears for housing the other of said gears.

4. In a device of the character described, the combination with a brake step, of a shaft journaled therein and extending beneath said step, of a single gear provided on the lowermost end of said shaft, another shaft arranged in offset relation to said first named shaft, said other shaft being provided at its upper end with a single gear adapted to mesh with said first named gear and forming at its lower end a winding drum, means including a casing provided on one of said gears for housing the other of said gears, and a bracket connected to said brake step and adapted to form a bearing for the upper end of said other shaft and a support for the second named gear.

5. In a device of the character described, the combination with a brake step, of a pair of offset parallel vertical shafts having connected thereto meshing gears for imparting motion from one to the other of said shafts, at least one of said gears being provided with a casing adapted to house the other of said gears and a one-piece bracket connected to the brake step and adapted to provide a bearing for one of the shafts and a support for the gear provided with the casing.

6. In a device of the class described, the combination with a brake step provided with a bearing, a shaft having its lower end journaled in said bearing and adapted to project beneath said brake step, a gear connected to said shaft, a bracket connected to the brake step and provided with a bearing, another shaft having its upper end journaled in said bearing, and a gear connected to the shaft above said bearing and adapted to mesh with the first named gear, said last named gear forming a casing for the first mentioned gear and being supported upon said bracket.

7. In a device of the class described, the combination with the end of a car, a brake step extending from said car end, and a pair of shafts having gearing connecting them, said gears being located beneath the brake step and wholly without the end of the car, one of said gears forming a casing for the other of said gears.

8. In a device of the class described, the combination with a car end, a brake step extending from said car end and arranged near the top thereof, a shaft journaled in said brake step and being provide at its lower end beneath the brake step with a gear, another shaft extending from beneath the brake step to a point below the bottom of the car end and adapted to form a winding drum, said shaft having a gear adapted to mesh with the first named gear and provide a casing therefor, and a plurality of bearings for said other shaft, one of said bearings being connected to and extending from the brake step and adapted to form a support for the second named gear.

In testimony whereof I affix my signature.

B. W. KADEL.